United States Patent
Frost et al.

(10) Patent No.: US 9,145,834 B2
(45) Date of Patent: Sep. 29, 2015

(54) TRANSVERSE MOUNTED ACCESSORY GEARBOX

(75) Inventors: Cristopher Frost, Scottsdale, AZ (US); Mary Eileen Richardson, Maricopa, AZ (US); Michael Stephen Crestin, Chandler, AZ (US); James Laffan, Phoenix, AZ (US); Mingfong Hwang, Phoenix, AZ (US); Doug Hollingshead, Phoenix, AZ (US); Marc Schmittenberg, Phoenix, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 1125 days.

(21) Appl. No.: 13/160,380

(22) Filed: Jun. 14, 2011

(65) Prior Publication Data

US 2012/0317991 A1    Dec. 20, 2012

(51) Int. Cl.
*F02C 7/32* (2006.01)
*F02C 7/36* (2006.01)

(52) U.S. Cl.
CPC ... *F02C 7/32* (2013.01); *F02C 7/36* (2013.01); *F05D 2260/53* (2013.01); *Y02T 50/671* (2013.01)

(58) Field of Classification Search
CPC .................................... F02C 7/32; F02C 7/36
USPC ............. 415/122.1, 124.1, 121.3; 416/170 R, 416/171; 60/802, 39.163
See application file for complete search history.

(56) References Cited

U.S. PATENT DOCUMENTS

| | | | |
|---|---|---|---|
| 2,608,056 A * | 8/1952 | Secord et al. | 60/802 |
| 3,455,182 A | 7/1969 | Kelley | |
| 3,714,779 A * | 2/1973 | Stein et al. | 60/796 |
| 4,068,470 A | 1/1978 | Sargisson et al. | |
| 5,143,329 A | 9/1992 | Coffinberry | |
| 5,687,561 A | 11/1997 | Newton | |
| 6,883,750 B2 | 4/2005 | Gmirya | |
| 7,063,734 B2 * | 6/2006 | Latulipe et al. | 96/189 |
| 7,484,354 B2 | 2/2009 | Stretton | |
| 7,500,365 B2 | 3/2009 | Suciu et al. | |
| 8,490,410 B2 * | 7/2013 | Suciu et al. | 60/802 |
| 2008/0073152 A1 * | 3/2008 | Eleftheriou et al. | 184/6.12 |
| 2009/0123274 A1 | 5/2009 | Chaudhry | |
| 2009/0139243 A1 | 6/2009 | Winter | |
| 2009/0212156 A1 | 8/2009 | Blumer | |
| 2009/0223052 A1 | 9/2009 | Chaudhry et al. | |
| 2010/0242496 A1 | 9/2010 | Cass et al. | |

* cited by examiner

*Primary Examiner* — Dwayne J White
*Assistant Examiner* — Adam W Brown
(74) *Attorney, Agent, or Firm* — Ingrassia Fisher & Lorenz, P.C.

(57) ABSTRACT

A gas turbine engine and an accessory gear box (AGB) are provided for. The gas turbine engine comprises a drive shaft, a compressor, a combustor and an exhaust turbine, where the exhaust turbine and the compressor are coaxially connected by the drive shaft. The gas turbine engine further comprises an engine casing of varying diameters circumferentially enveloping the compressor, the combustor and the exhaust turbine with a waist located between the compressor and the combustor. The gas turbine engine also includes an accessory gear box (AGB) attached to the engine casing at the waist, the AGB comprising a gear rotating on an axis extending in a transverse direction relative to that of the drive shaft.

13 Claims, 6 Drawing Sheets

TRANSVERSE AGB

CONVENTIONAL AGB

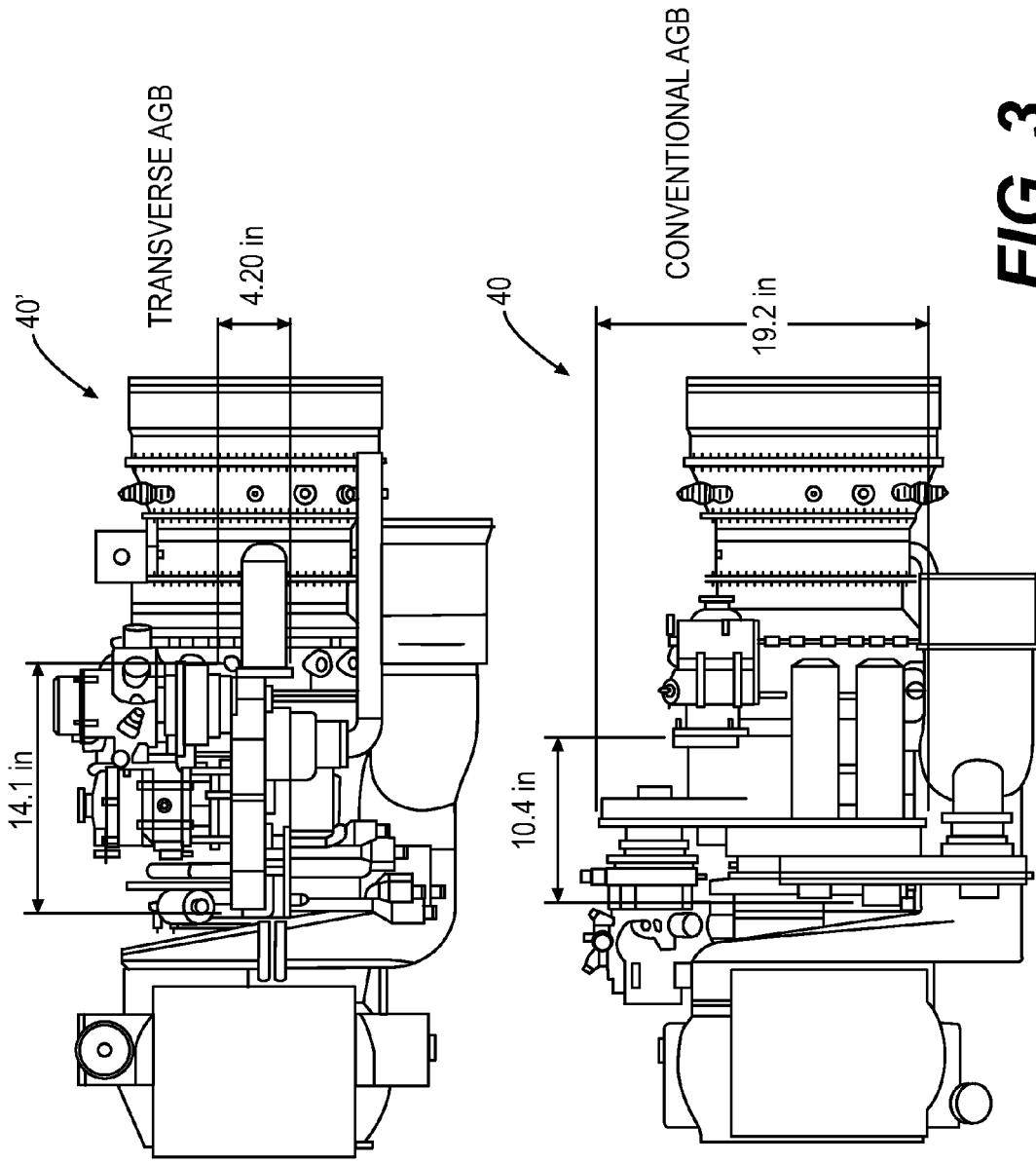

TRANSVERSE MOUNTED ACCESSORY GEARBOX

STATEMENT REGARDING FEDERALLY SPONSORED RESEARCH OR DEVELOPMENT

This invention was made with Government support under contract number W911W60820001 awarded by the Unites States Army under the Advanced Affordable Turbine Engine program. The Government has certain rights in this invention.

TECHNICAL FIELD

The present invention generally relates to gas turbine engines, and more particularly relates to an arrangement and connection of an accessory gear box to the power shaft.

BACKGROUND

An accessory gear box (AGB) is mounted on a gas turbine engine and drives various support components required to sustain engine operation. The support components include but are not limited to a fuel pump, an oil pump, an air driven starter, and air/oil separator, and an electrical generator. These components, the gearbox and the engine itself must fit within a confined space called an engine nacelle.

Referring to FIG. 1, a typical gas turbine engine 100 comprises of a compressor section 5, a combustion section 10 and a turbine section 15 arranged sequentially in that order. All of these sections are roughly cylindrical and oriented coaxially. A set of compressor blades in the compressor section 5 and a set of turbine blades in the turbine section 15 are driven in tandem by the engine drive shaft 30 extending coaxially completely through the gas turbine engine 100 from the compressor section 5 to the turbine section 15.

A tower shaft that is driven by bevel gears off of the drive shaft is typically used to transfer power from the drive shaft 30 to the auxiliary gearbox that is located outside of the exterior casing of the gas turbine engine and inside the nacelle or engine bay. A conventional gear box has at least one gear axis 41 running parallel with the engine drive shaft 30. The AGB 40 drives the support components 42 via a series of interlocking drive gears (See, FIG. 1B) that are oriented orthogonally to the gear axis 41. Each of the support components 42 are arranged arcuately around the engine casing 50 and located radially away from the drive shaft 30 and are situated outboard of the widest cylindrical section of the gas turbine engine (e.g., the air collector 45) in order to fit within the nacelle or the engine bay and also not interfere with the engine casing 50. This positioning is necessary because the irregular radius of the gas turbine engine casing 50 physically precludes the combined auxiliary gear box 40 and its support components 42 from being installed any closer to the drive shaft of the gas turbine engine.

The relatively long tower shaft 35 driving the AGB 40 and the disbursed, arcuate arrangement of the support components 42 (see, FIG. 1B) produces a significant churning of lubrication oil within the AGB 40 and results in less than efficient lubrication and lubrication oil scavenging. The arrangement also requires an unnecessarily large amount of space within the nacelle or engine bay (See, FIG. 3).

Accordingly, it is desirable to provide an alternative gearbox architecture that allows the gearbox to be compactly contoured and positioned closer to the exterior engine casing to reduce weight and improve oil scavenging.

In addition, it is desirable to provide a gearbox architecture providing superior oil scavenging from the gearbox housing. Furthermore, other desirable features and characteristics of the present invention will become apparent from the subsequent detailed description of the invention and the appended claims, taken in conjunction with the accompanying drawings and this background of the invention.

BRIEF SUMMARY

A gas turbine engine is provided. The gas turbine engine comprises a drive shaft, a compressor, a combustor, and an exhaust turbine, where the exhaust turbine and the compressor are coaxially and serially connected by the drive shaft. The gas turbine further comprises an engine casing of varying diameters that circumferentially envelopes the compressor, the combustor and the exhaust turbine. The gas turbine engine and engine casing has a waist located between the compressor and the combustor. The gas turbine engine also comprises an accessory gear box ("AGB") attached to the engine casing at or near the waist. The AGB comprises a gear rotating on an axis extending in a transverse direction relative to that of the drive shaft.

An AGB is provided. The AGB comprises a housing defining an opening and two or more gears mounted within the housing. Each of the two or more gears rotates about its own axis where each axis is transverse to the drive shaft of the gas turbine engine.

A gas turbine engine is provided. The gas turbine engine comprises a drive shaft; and an accessory gear box (AGB). The AGB further comprises a housing having an opening and two or more gears mounted within the housing, each of the two or more gears rotating about its own axis, each axis being transverse to an axis of the drive shaft of the gas turbine engine.

BRIEF DESCRIPTION OF THE DRAWINGS

The present invention will hereinafter be described in conjunction with the following drawing figures, wherein like numerals denote like elements.

FIG. 3 is a comparison plan view of the dimensions of the gas turbine engine with the conventional AGB and an exemplary transverse AGB installed.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
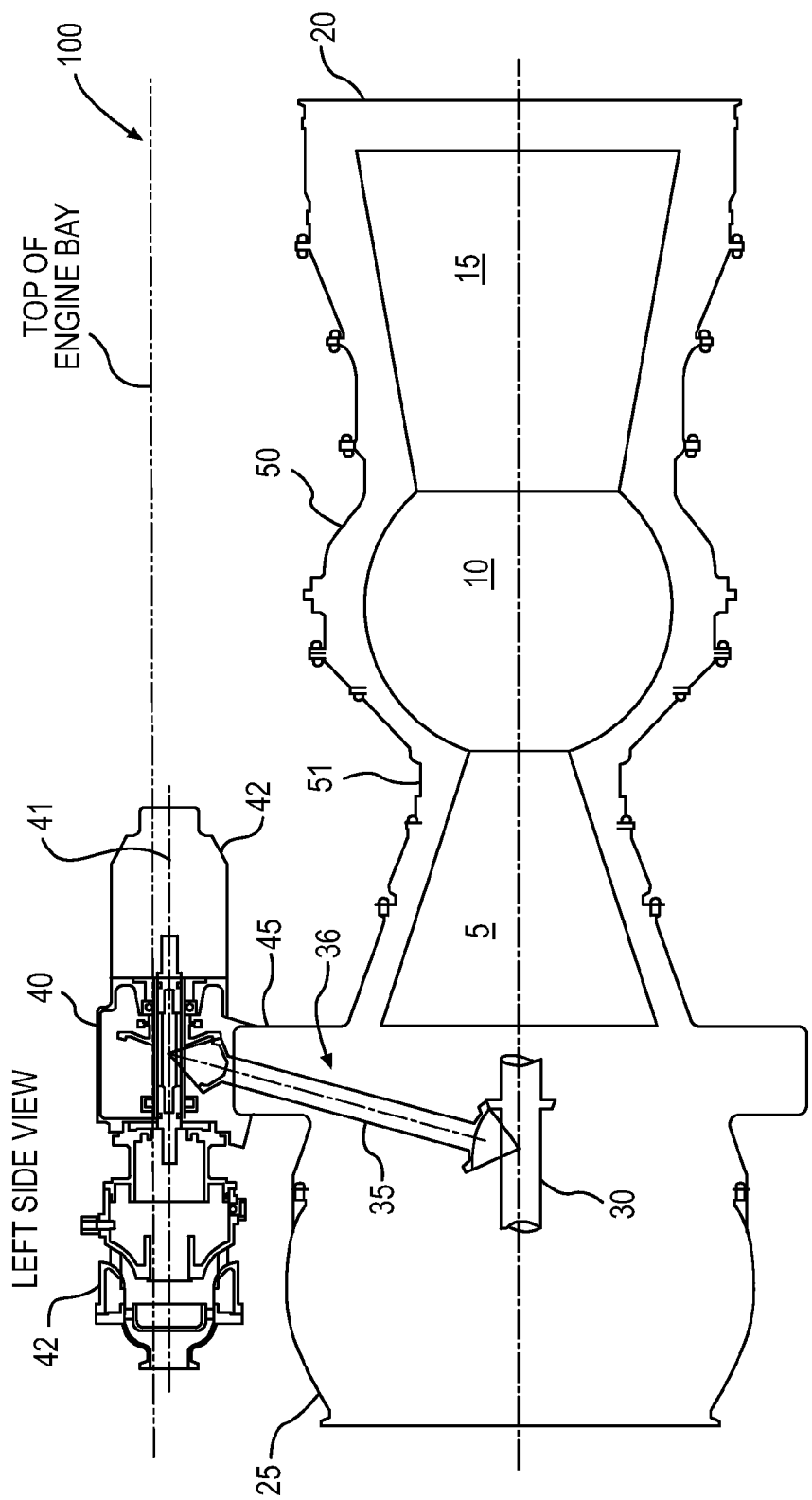
FIG. 1 is a left side cutaway view of an exemplary gas turbine engine with a conventional longitudinal accessory Gear Box (AGB)

FIG. 1 is a simplified cross sectional side view of a gas turbine engine 100 and a conventional AGB 40 mounted thereon at the periphery of the air collector 45. A typical gas turbine engine includes an air intake bellmouth 25, a compressor 5, a combustion section 10, an exhaust turbine 15, an exhaust plenum 20 and a conventional AGB 40. The compressor 5, the exhaust turbine 15 and the AGB 40 are all coaxially driven by the drive shaft 30, which is shown only in part in the interest of brevity and clarity.

With the exception of the AGB 40, the entire engine is enclosed in an engine casing 50. The engine casing 50 and the AGB 40 must all fit with the confines of an aerodynamic nacelle or within an engine bay. A nacelle is a cover housing that is separate from the aircraft fuselage that holds engines, fuel, or equipment.

Figure 1A:
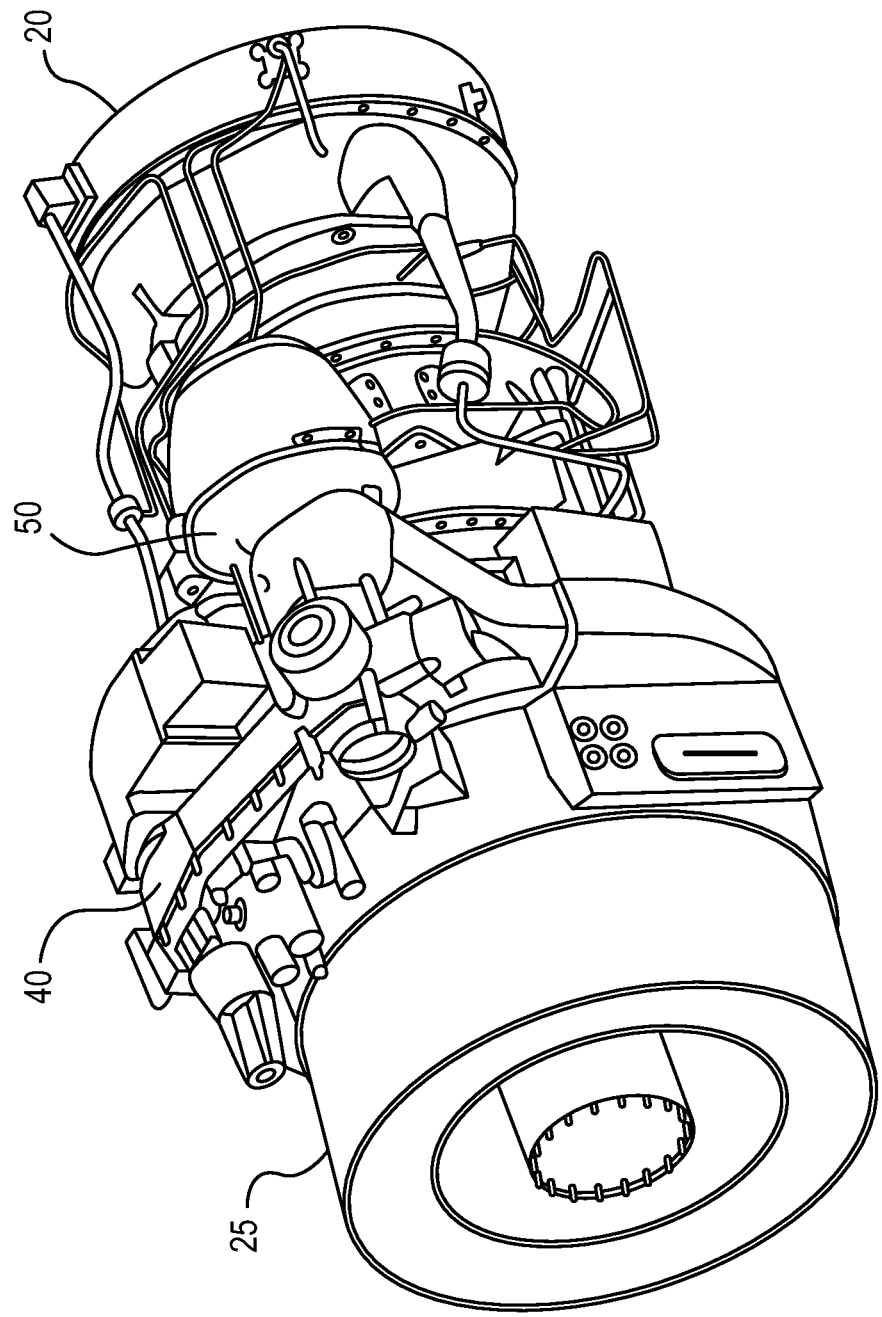
FIG. 1A is a perspective view of the gas turbine engine with a conventional AGB wrapped around the top of the engine casing.

Conventionally, accessories 42 that are driven by the accessory gearbox are arranged in a direction that is coaxial with the drive shaft 30 and are dispersed arcuately along an angular segment of the air collector 45 section of the engine casing 50 (See, FIG. 1A). This arrangement permits the accessories 42 to fit between a wall of an engine bay and the engine casing 50. Thus, in conventional architectures the AGB 40 must also be arcuate.

Figures 1B, 2B:
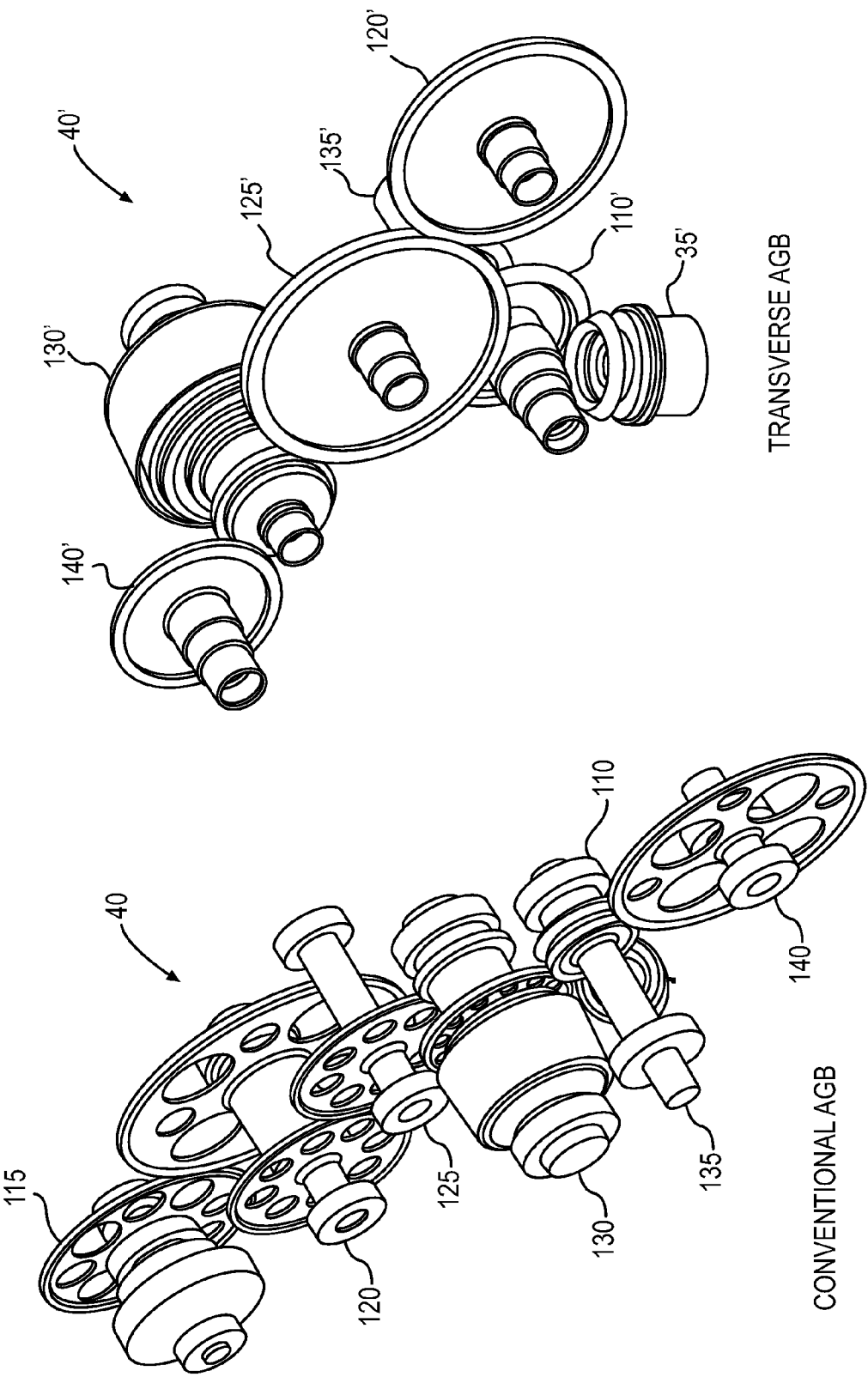
FIG. 1B is a disembodied view of a gearing arrangement of a conventional longitudinal AGB.
FIG. 2B is a disembodied view of an exemplary view of a gearing arrangement of an exemplary transverse AGB according to embodiments.

FIG. 1B is a simplified typical gearing architecture of a conventional AGB 40. The AGB 40 may include, inter alia, gearing for a starter 110, an inlet particle accelerator fan 115, a compound idler gear 120, lubrication oil pump 125, an air oil separator 130, a generator shaft 135 and a fuel pump 140. The AGB 40 is driven by the drive shaft 30 via a relatively long tower shaft 35 (See FIG. 1) and its associated bevel gears.

Referring again to FIG. 1, the accessories 42 driven by the AGB 40 must be positioned around the circumference of the engine casing 50 to locations on the air collector 45 that are radially the closest to the drive shaft of the gas turbine engine 100 in order to maximize the space available between the nacelle and the engine casing 50. As can be seen in FIG. 1, it is shown that the AGB 40 must be simultaneously positioned distantly from the drive shaft 30 to allow the accessories 42 that are mounted on the forward or aft side of the AGB 40 to clear the air collector 45 portion of the engine casing 50. Thus, the tower shaft 35 must be long enough to extend from the drive shaft 30 to the gearing (See, FIG. 1A) of the AGB 40. Because the accessories 42 are arrayed around the circumference of the engine casing 50, the AGB 40 is necessarily laid out in the narrow arcuate configuration that wraps around the engine casing at a distance required to clear the radial profile of the engine casing 50. The resulting arcuate arrangement of the AGB 40 makes oil management more difficult because the oil is susceptible to gear churn as it travels along inside the AGB 40 to the various scavenger ports (not shown) towards either distal end of the AGB 40. Thus, the arcuate arrangement requires more oil scavenging points to collect the lubricating oil and return it to the lubricating oil pump.

Figure 2:
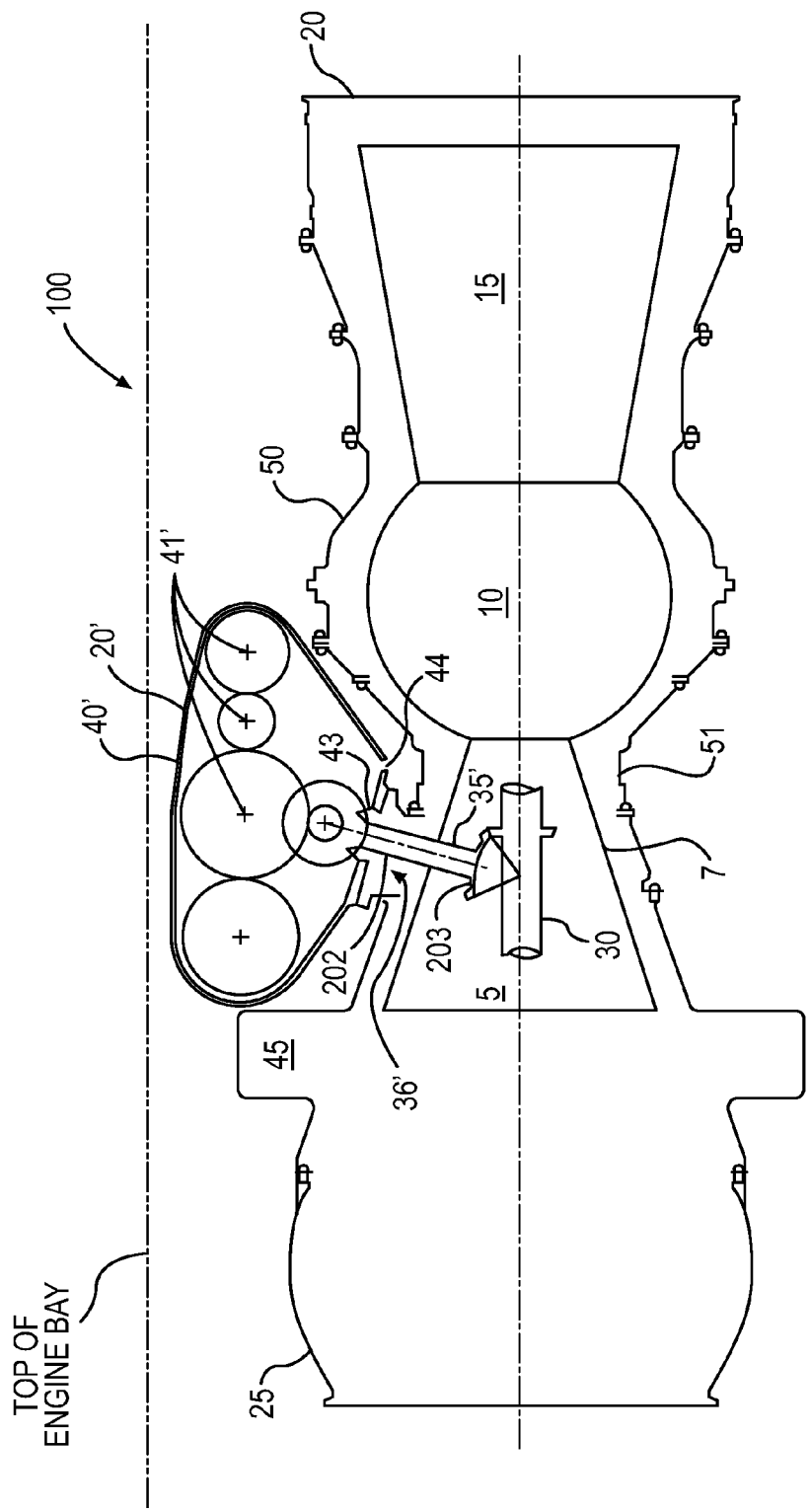
FIG. 2 is a left side cutaway view of a gas turbine engine with an exemplary transverse AGB installed at the engine casing waist according to embodiments.

FIG. 2 is a simplified cross sectional side view of the gas turbine engine 100 and an exemplary transverse AGB 40' mounted thereon according to embodiments. The gas turbine engine 100 includes the air intake bellmouth 25, the compressor 5, the combustion section 10, the exhaust turbine 15, the exhaust plenum 20 and a transverse AGB 40'. The compressor 5, the combustion section 10, the exhaust turbine 15 and the transverse AGB 40' are all driven by the drive shaft 30, which is shown in part in the interest of brevity and clarity.

A salient feature of the embodiments of FIG. 2 is the rotational axes 41' of the transverse AGB 40' are perpendicular to the drive shaft 30. Thus, the rotational axes 41' of all of the accessories (not shown) driven by the transverse AGB 40' are also perpendicular to the drive shaft 30. Although the rotational axes 41' of the transverse AGB 40' are disclosed as being perpendicular, it will be appreciated that the rotational axes 41' need not be precisely perpendicular. The rotational axes 41' of the transverse AGB 40' may deviate from true perpendicularity as may be required by the overarching design of the gas turbine engine 100.

Another salient feature of the embodiments of FIG. 2 is that the mounting for the transverse AGB 40' may be moved aft from the air collector 45 towards the combustion section 10 to take advantage of the narrower radius of the engine casing in the vicinity of a narrowing (commonly referred to as the waist) 51 of the engine casing 50 that is located in the vicinity of the high pressure stages 7 of the compressor 5. Thus, the accessories (not shown) may be aggregated together more compactly in the transverse AGB 40' to fit into the space available at the waist 51. In the case of the conventional AGB 40 (See, FIG. 1), the length of the various accessories attached thereto prevented any space savings because the physical size of the accessories clashed either with the air collector 45 or the engine casing 50 in the vicinity of the combustion section 10. An additional advantage that may be realized from the use of a transverse AGB 40' is that the tower shaft 35' may be reduced in length thereby eliminating weight and reducing torsion strain that would otherwise occur in a longer tower shaft (such as tower shaft 35 of FIG. 1). The tower shaft 35' has a first end 202 and a second end 203. The first end 202 is connected to the gearing 42' of the transverse AGB 40' via a translational gear 43 and the second end 203 is connected to the drive shaft 30 via a bevel gear via the opening 36' in the housing 20'.

Further, oil scavenging is improved. By reducing the width and increasing the depth of the transverse AGB 40', most of the AGB lubrication oil returns to the engine casing via the tower shaft opening 36' in the transverse AGB 40'. Thus, fewer scavenging ports 44 are required in the AGB housing 20' to collect and return the AGB lubrication oil. Whatever number of scavenging ports 44 that may be required can be located at the lowest points in the transverse AGB 40'. This may be desirable to scavenge oil when the gas turbine engine 100 is in a non-level flight attitude such that the tower shaft opening 36' is not the lowest point in the transverse AGB 40'. FIG. 2 illustrates one scavenging port 44 at a potential low point in the transverse AGB 40'. Such illustration is merely exemplary and should not be construed as limiting the number of scavenging ports disclosed herein to the single scavenging port 44.

Figure 2A:
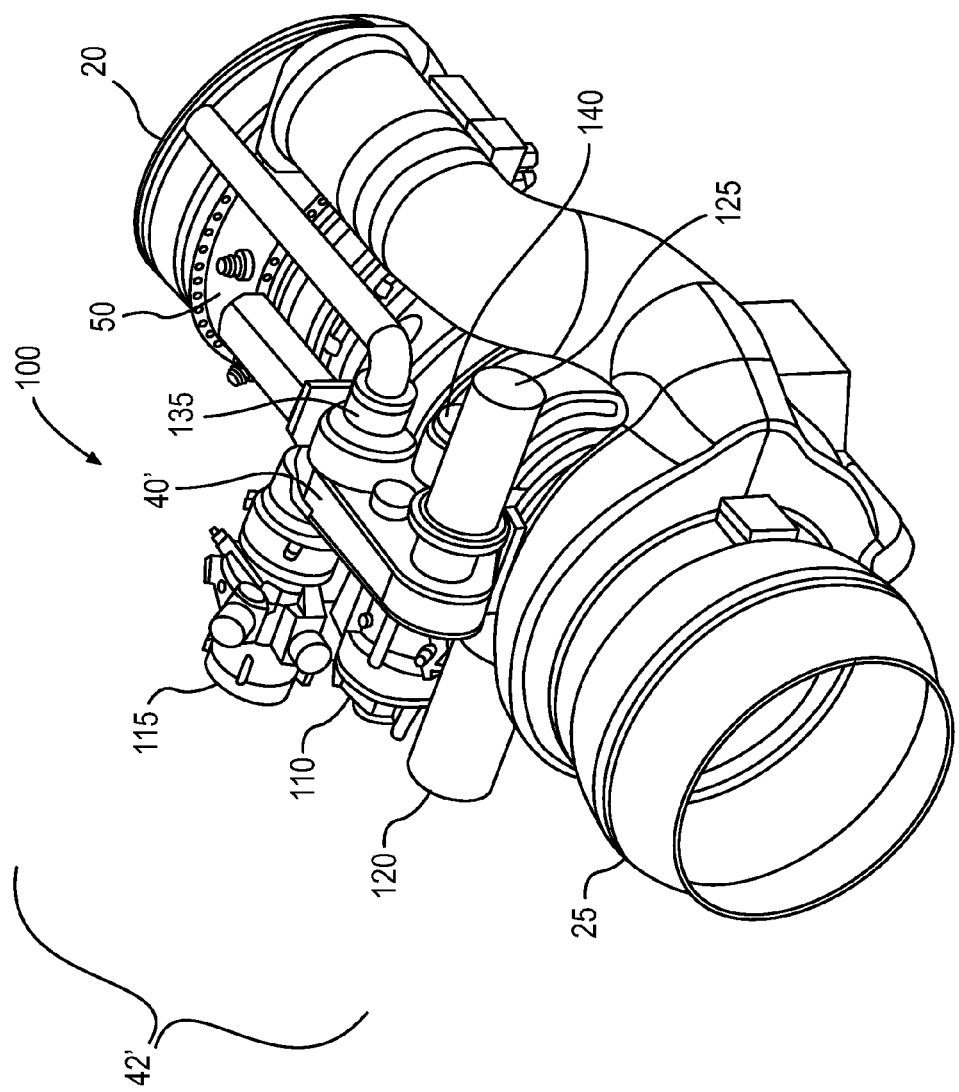
FIG. 2A is a perspective view of the gas turbine engine with an exemplary transverse AGB installed at the engine casing waist according to embodiments.

FIG. 2A is an rendition of an exemplary installation on an HPW3000 gas turbine engine produced by from Advanced Turbine Engine Company (ATEC) with a exemplary transverse mounted AGB 40' according to embodiments. The gas turbine engine 100 includes the housing 50, the air intake bellmouth 25, the compressor 5, the combustion section 10, the exhaust turbine 15, the exhaust plenum 20 (See, FIG. 2) and the transverse AGB 40'. The accessories 42' driven by the transverse AGB may include a starter 110, an inlet particle accelerator fan 115, one or more pumps (120,125), an air oil separator 130, an air turbine starter 135 and a fuel control unit 140.

FIG. 2B is a disembodied view of an exemplary gearing arrangement for a transverse AGB 40'. The transversal AGB 40' is driven by the tower shaft 35' (via a bevel gear) and drives a number of gears (110'-140') for the accessories 42'. Exemplary accessories may include the air oil separator 130', fuel pump 120', idler gear 25', starter 110', generator shaft 135' and a lubrication oil pump 140' (See, also FIG. 2A).

FIG. 3 is a side by side comparison of plan views of an exemplary gas turbine engine with a conventional AGB 40 and with a transverse AGB 40'. As may be seen, the width requirement of the transverse AGB 40' is 4.2 in. as compared to the conventional AGB 40 that has a width requirement of 19.2 in., which is a 79% reduction. The length requirement in this particular embodiment increases slightly from 10.4 inches to 14.1 inches. Because the AGB 40 represents the widest component of the engine; it is the controlling factor in regard to space constraints within the engine bay or nacelle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:
   a compressor, a combustor and an exhaust turbine each coaxially and serially coupled by a drive shaft having a rotational axis;
   an engine casing of varying diameters circumferentially enveloping the compressor, the combustor and the exhaust turbine and having a waist located between the compressor and the combustor;
   an accessory gear box (AGB) attached to the engine casing near the waist, the AGB comprising a plurality of gears rotating about a plurality of parallel axes, each of the parallel axes extending in a direction that is substantially perpendicular relative to the rotational axis of the drive shaft, each of the gears arranged in the AGB to form a single row within the AGB, the single row extending along an axis substantially parallel to the rotational axis of the drive shaft; and
   a tower shaft that couples one of the plurality of gears to the drive shaft, the tower shaft having a longitudinal axis that is transverse to the rotational axis of the drive shaft and the plurality of axes of the plurality of gears.

2. The gas turbine engine of claim 1, wherein the AGB is connected to and is driven by the drive shaft via the tower shaft through a tower shaft opening between the AGB and the engine casing.

3. The gas turbine engine of claim 2, wherein the AGB is lubricated by oil.

4. The gas turbine engine of claim 3, wherein all of the oil drains into the engine casing via the tower shaft opening.

5. The gas turbine engine of claim 4, wherein the AGB comprises at least one oil scavenging port permitting scavenging oil during operation at non-level attitudes.

6. The gas turbine engine of claim 2, wherein the tower shaft engages the drive shaft downstream of a low pressure stage of the compressor.

7. A gas turbine engine comprising an accessory gear box (AGB) configured to drive one or more accessories of a gas turbine engine having a drive shaft, the drive shaft having a rotational axis, the drive shaft coaxially and serially coupling at least a compressor and a combustor of the gas turbine engine, the AGB comprising:
   a housing having an opening;
   two or more gears mounted within the housing, each of the two or more gears rotating about its own axis, each axis being parallel to the other axis and both axes being substantially perpendicular to the rotational axis of the drive shaft of the gas turbine engine, each of the gears arranged in the AGB to form a single row within the AGB, the single row extending along an axis substantially parallel to the rotational axis of the drive shaft; and
   a tower shaft that couples one of the two or more gears to the drive shaft, the tower shaft having a longitudinal axis that is transverse to the rotational axis of the drive shaft and the axes of the two or more gears.

8. The AGB of claim 7, further comprising:
   a translational gear,
   wherein the tower shaft has a first end and a second end, the first end connected to one of the two or more gears via the translational gear and the second end connected to the drive shaft via the opening in the housing.

9. The AGB of claim 8, wherein lubricating oil is permitted to drain into the engine casing via the opening.

10. The AGB of claim 9, wherein the AGB comprises at least one oil scavenging port other than the opening permitting oil scavenging at non-level attitudes.

11. A gas turbine engine, comprising:
    a compressor, a combustor and an exhaust turbine are each coaxially and serially coupled by a drive shaft having a rotational axis; and
    an accessory gear box (AGB), the AGB further comprising:
    a housing having an opening;
    two or more gears mounted within the housing, each of the two or more gears rotating about its own axis, each axis being parallel to the other axis and both axes being substantially perpendicular to the rotational axis of the drive shaft of the gas turbine engine, each of the gears arranged in the AGB to form a single row within the AGB, the single row extending along an axis substantially parallel to the rotational axis of the drive shaft;
    a translational gear; and
    a tower shaft with a first end and a second end, the first end connected to one of the two or more gears via the translational gear and the second end connected to the drive shaft via the opening in the housing, the tower shaft having a longitudinal axis that is transverse to the rotational axis of the drive shaft and the axes of the two or more gears.

12. The gas turbine engine of claim 11, wherein lubricating oil is permitted to drain into an engine casing via the opening.

13. The gas turbine engine of claim 12, wherein the AGB comprises at least one oil scavenging port other than the opening permitting oil scavenging at non-level positional attitudes.

* * * * *